US008600788B2

(12) United States Patent
Loos

(10) Patent No.: US 8,600,788 B2
(45) Date of Patent: Dec. 3, 2013

(54) SEARCH-BASED USER INTERACTION MODEL FOR SOFTWARE APPLICATIONS

(75) Inventor: Christian Loos, Wiesloch (DE)

(73) Assignee: SAP AG, Walldorf (DE)

( * ) Notice: Subject to any disclaimer, the term of this patent is extended or adjusted under 35 U.S.C. 154(b) by 1123 days.

(21) Appl. No.: 11/871,077

(22) Filed: Oct. 11, 2007

(65) Prior Publication Data

US 2009/0100427 A1 Apr. 16, 2009

(51) Int. Cl.
*G06Q 10/00* (2012.01)

(52) U.S. Cl.
USPC .... 705/7; 705/26; 705/27; 705/35; 705/36 R; 705/37

(58) Field of Classification Search
USPC ...................... 705/7, 26, 27, 35, 36, 37, 36 R
See application file for complete search history.

(56) References Cited

U.S. PATENT DOCUMENTS

| | | | | |
|---|---|---|---|---|
| 6,199,079 | B1 * | 3/2001 | Gupta et al. | 715/207 |
| 7,155,439 | B2 * | 12/2006 | Cope | 1/1 |
| 7,334,184 | B1 * | 2/2008 | Simons | 715/234 |
| 7,577,587 | B2 * | 8/2009 | Gee | 705/26 |
| 2002/0103712 | A1 * | 8/2002 | Rollins et al. | 705/26 |
| 2004/0148248 | A1 * | 7/2004 | Allen et al. | 705/37 |
| 2005/0234939 | A1 * | 10/2005 | Arend et al. | 707/100 |
| 2006/0036954 | A1 | 2/2006 | Satyadas et al. | |
| 2006/0136389 | A1 | 6/2006 | Cover et al. | |

OTHER PUBLICATIONS

The Konqueror Handbook, Rewan Loisant, Pamela Roberts, Rev 3.1, 2002. Wayback Machine location: http://web.archive.org/web/20040812191823/docs.kde.org/en/3.2/kdebase/konqueror/.

The KFind Handbook, Dirk Doefflinger, Revision 1.20.01, Apr. 2004. Wayback Machine location: http://web.archive.org/web/20070522033129/docs.kde.org/development/en/kdebase/kfind/index.html.

KDE 2.0 architecture, the KDE Team, 2002. Wayback Machine location: http://web.archive.org.web/20020610042545/developer.kde.org/documentation/kde2arch/index.html.

Deductus disk catalog and personal full-text search engine, 2003. Screen capture of application with highlighting in preview window. Wayback Machine location: http://web.archive.org/web/20031004180957/http://www.aolej.com/dedu/img/screen2.gif.

Copernic Desktop Search—The Search Engine for your PC. http://web.archive.org/web/20041229125453/http://www.copernic.com/en/products/desktop.

* cited by examiner

*Primary Examiner* — Nga B. Nguyen

(74) *Attorney, Agent, or Firm* — Mintz, Levin, Cohn, Ferris, Glovsky and Popeo, P.C.

(57) ABSTRACT

Data is received that characterizes one or more terms within a task initiation request. These terms are then associated with a task template. At least a portion of such a task template is populated based on the terms so that the populated task template can be presented to the user to enable a user to conduct one or more actions associated with the presented populated task template. Related techniques, apparatus, systems, and methods are also described.

20 Claims, 7 Drawing Sheets

400

500

1000

1100

SEARCH-BASED USER INTERACTION MODEL FOR SOFTWARE APPLICATIONS

TECHNICAL FIELD

The subject matter described herein relates to search based techniques for initiating tasks within an application.

BACKGROUND

Conventional user interaction models follow a structured, hierarchical navigation approach. Menus are often provided that group features into certain categories with links that lead to a certain feature. Additionally, buttons can be provided that represent different actions on an object. While such an interaction model presents users with all options that are available, it also requires quite some learning to get familiar with the application. One has to learn which links to follow, where in the menu structure a certain feature is located and which button corresponds to which action, and the like.

As an example, with an application for creating purchase orders, a sample navigation tree might include:

- Order Management
  - Purchase Orders
    - Create Purchase Order
      - Add Item(s)
      - Set quantity
      - Choose supplier
      - Save Order The whole task to create a purchase order with two items involves nine steps, which the user has to memorize. This task implicates the names and positions of various user interface elements such as menu items, hyperlinks, buttons and input fields. Any change in the user interface (e.g., new version of the software, additional features, different vendor, etc.) can disrupt the user's understanding of how the software works, thereby necessitating the user to learn the modified model.

SUMMARY

In one aspect, data characterizing one or more terms of a task initiation request within a software application is received. At least one of these terms is associated with a task template. At least a portion of the task template is populated based on the associated one or more terms. Thereafter, the populated task template is presented to enable a user to conduct one or more actions associated with the presented populated task template.

The association of task templates can be based on, for example, polling a data repository (and/or an index of a data repository) to identify one or more stored task templates. Depending on whether there are more than one stored task templates that are associated with the terms, the populated task template can be populated based on two more identified stored task templates. For example, if the search terms are "order pencils", and the last two orders for pencils were for different amounts, these different amounts may be both displayed to allow the user to select one of them.

The stored task templates can be based on one or more of user-defined rules which map certain terms to certain task templates and historical task templates utilized by the user (and/or entities other than the user).

The populating can comprise a variety of actions that a user would otherwise undertake on a task template. For example, fields of the task template may be populated with values and graphical user interface elements may be activated.

In an interrelated aspect, first data characterizing one or more terms within a task initiation request is received. A data repository is then polled to obtain a plurality of task templates associated with the terms. Second data characterizing the plurality of obtained task templates is presented to a user which results in the receipt of user-generated input selecting one of the presented plurality of obtained task templates. Subsequently, the selected task template is presented to enable the user to conduct one or more actions associated with the presented task template.

In a further interrelated aspect, a system architecture can include a user interface, a parsing engine, a first data repository, an indexing service, an application data store, an execution engine, and a business application. The user interface can receive a user-generated task request containing terms. The parsing engine can parse the task request. The first data repository can be coupled to the parsing engine to store user-defined rules associated search terms with task templates. The indexing service can be coupled to the parsing engine to provide an index characterizing previously generated task templates. The application data store can be coupled to the indexing service to store data characterized in the indexing service. The execution engine can be coupled to the parsing engine to initiate a generation of a task template based on the terms. The business application can be coupled to the execution engine to present a user with a task template in response to a delegation by the execution engine. The business application can also be coupled to the application data store to obtain contextual information based on the terms for at least partially populating the task template.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, by allowing a user to initiate certain tasks within an application via a key word search rather than by traversing a hierarchical navigation, such tasks may be initiated more rapidly. Moreover, a search-based approach minimizes an amount of time required to complete a task when a traditional hierarchy is modified to reflect new inputs and the like.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
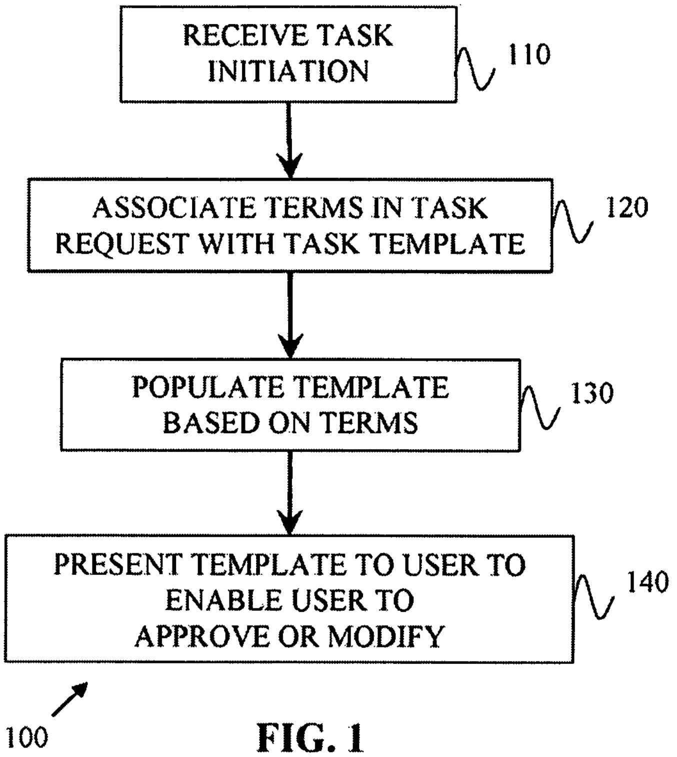
FIG. 1 is a process flow diagram illustrating a first technique for the presentation of a task template in response to a task initiation request.

FIG. 1 is a process flow diagram illustrating a method 100, in which, at 110, data characterizing one or more terms within a task initiation request is received. Thereafter, at 120, the terms are associated with a task template. At least a portion of the task template is populated, at 130, based on the one or more terms and subsequently presented, at 140, to enable a user to conduct one or more actions associated with the presented populated task template.

As used herein, the term task template refers to any interface through which user input is required to complete an action. The task template could be a form, a menu, or workflow approval item, and the like. The term populating as used herein refers to any modification that can occur in relation to a task template including provision of values for certain fields and/or activation of graphical user interface elements on the task template.

Figure 2:
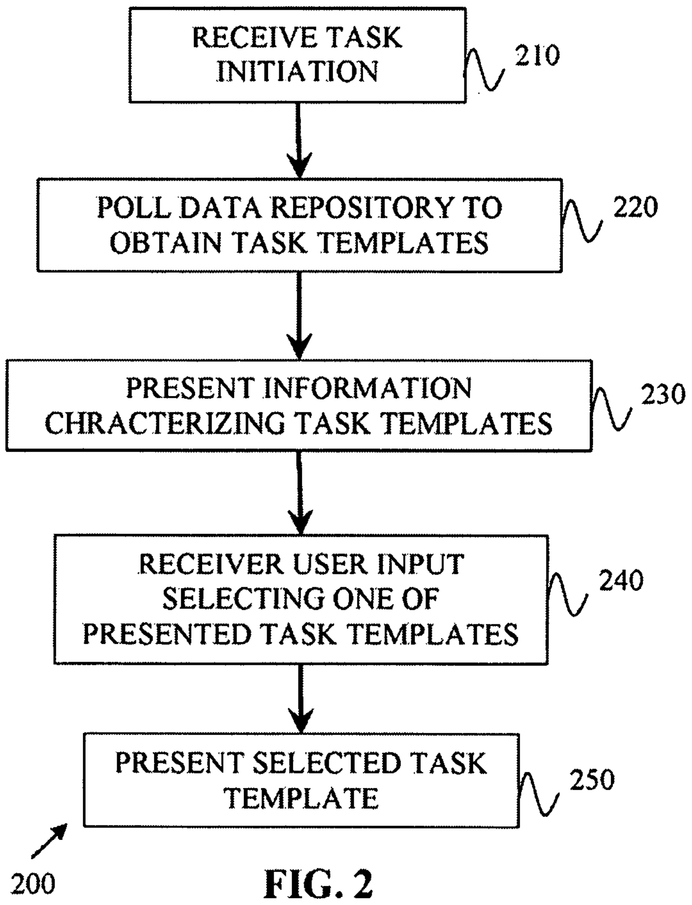
FIG. 2 is a process flow diagram illustrating a second technique for the presentation of a task template in response to a task initiation request.

FIG. 2 illustrates a method 200, in which, at 210, first data characterizing one or more terms within a task initiation request is received. In response to the receipt of the first data, a data repository is polled, at 220, to obtain a plurality of task templates associated with the terms. Second data (e.g., previews, summaries, etc.) characterizing the plurality of obtained task templates is presented, at 230, to a user to enable the user, at 240, to select one such template. Thereafter, at 250, the selected task template is presented to enable the user to conduct one or more actions associated with the presented populated task template.

Figure 3:
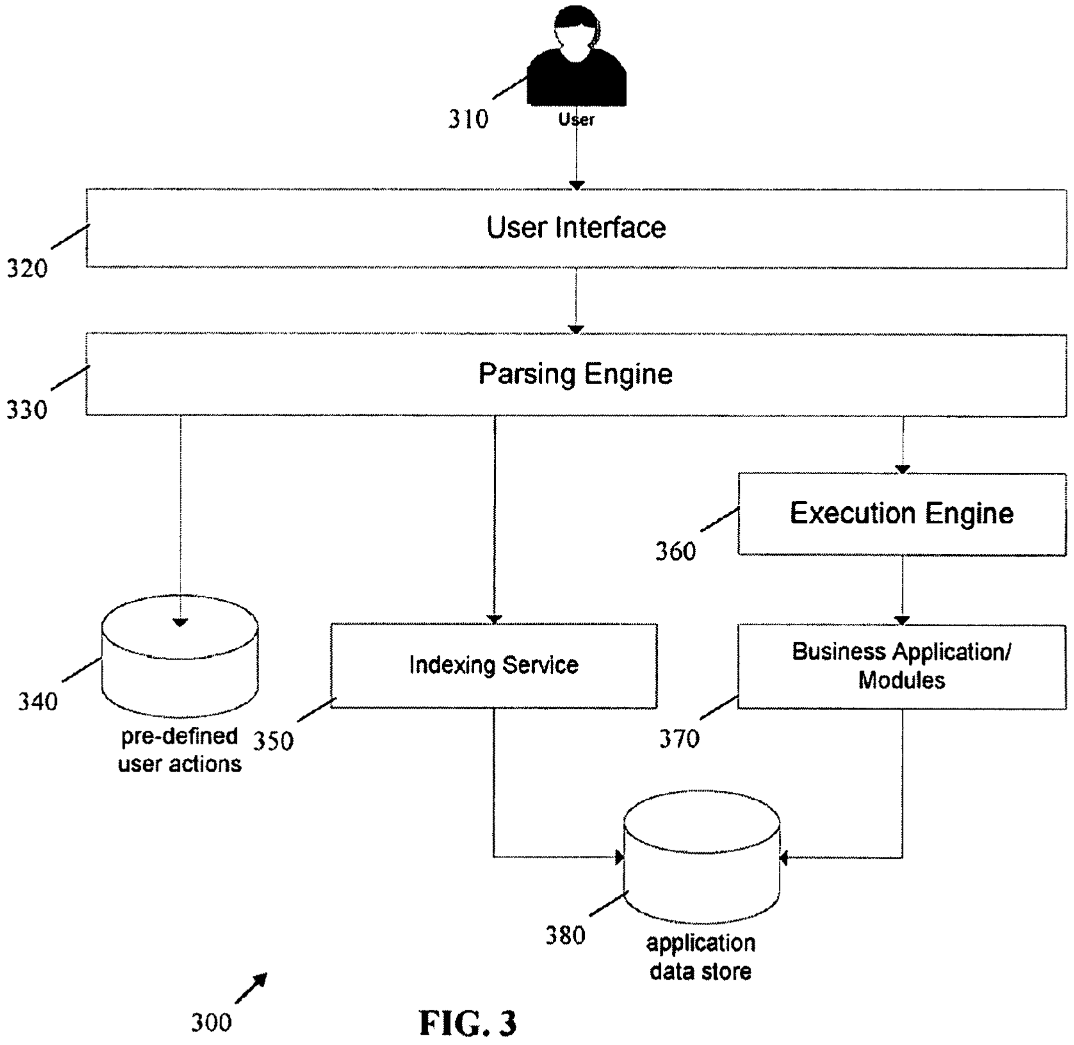
FIG. 3 is a diagram illustrating a system architecture for presenting a task template in response to a task initiation request.

FIG. 3 illustrates a sample system architecture 300 in which a user 310 accesses a user interface 320. The user interface 320 is operable to receive a task request including search terms input by the user 310 which are then subjected to a parsing engine 330. The parsing engine 330 can determine whether the terms within the task request are subject to predefined user actions by polling an associated data repository 340. For example, there may be certain fixed pre-defined relationships between a particular term and a task template. The term "reimbursement" might always result in a travel expenses form being displayed. The term "leave" might result in a leave request form being displayed, and the like. The data repository 340 could be populated via an interface that allows a user to define new keywords, task templates, and interrelationships of same. For example, the data repository 340 could maintain a mapping between a keyword (e.g., "purchase") and a certain screen (like "Enter Purchase Order"), or a service (e.g. SAP Enterprise Service) for non-UI tasks.

In some implementations, the particular task template to be displayed can be based on previous user actions stored in an application data store 360 which have been indexed 350. In other words, the search terms may be associated with previously generated tasks (and their associated task templates). Such previously generated tasks may be grouped in any fashion, such as by user, user workgroup, IP address, and the like. By contextually providing task templates, the amount of time for a user to generate a task can be greatly reduced.

Once the appropriate task template is defined, an execution engine 380 will cause the business application and/or module 390 to initiate the display of the task template (or task templates). As stated above, depending on the contents of the task request, certain aspects of the task template may be prepopulated with values (as described below).

Figure 4:
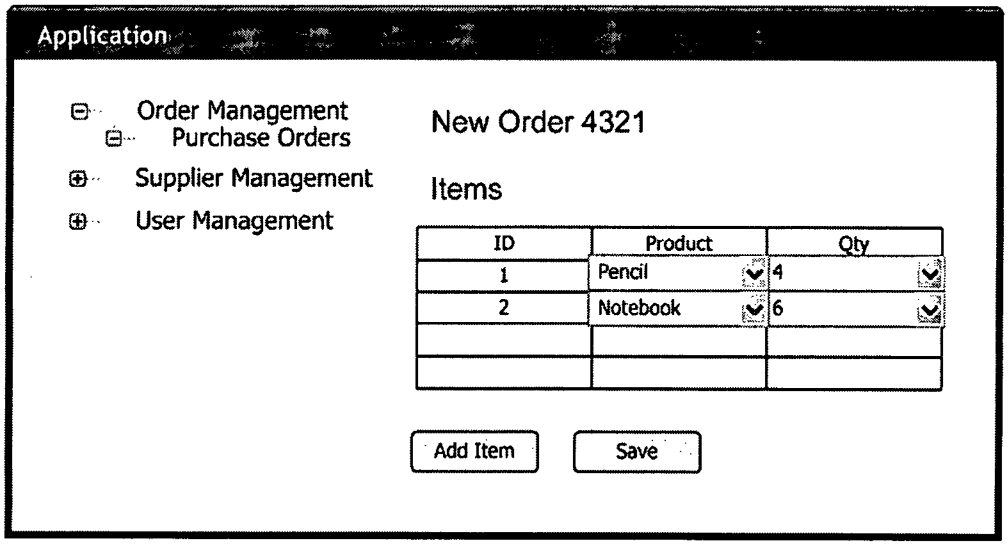
FIG. 4 is a diagram illustrating a first task template.

The user interface 320 can include a single input field which allows a user to enter one or more terms. In an example of a purchasing application, the user 310, when seeking to order 4 pencils and 6 notebooks might initiate a task request by entering the following into the input field "order 4 pencils, 6 notebook". After submitting such a request, a task template 400 as illustrated in FIG. 4 consisting of a prepared order including fields populated with quantities of the two order items for pencil and notebook can be presented to a user for modification or approval. This particular task template was associated with the term "order" (using the pre-defined user actions repository 340) and the values for the items pencils and notebooks were used by the parsing engine 330 to cause the execution engine 360 to cause the business application 370 to populate a portion of the order, thereby reducing an amount of time required for the user 310 to locate and modify a blank order task template.

Figure 5:
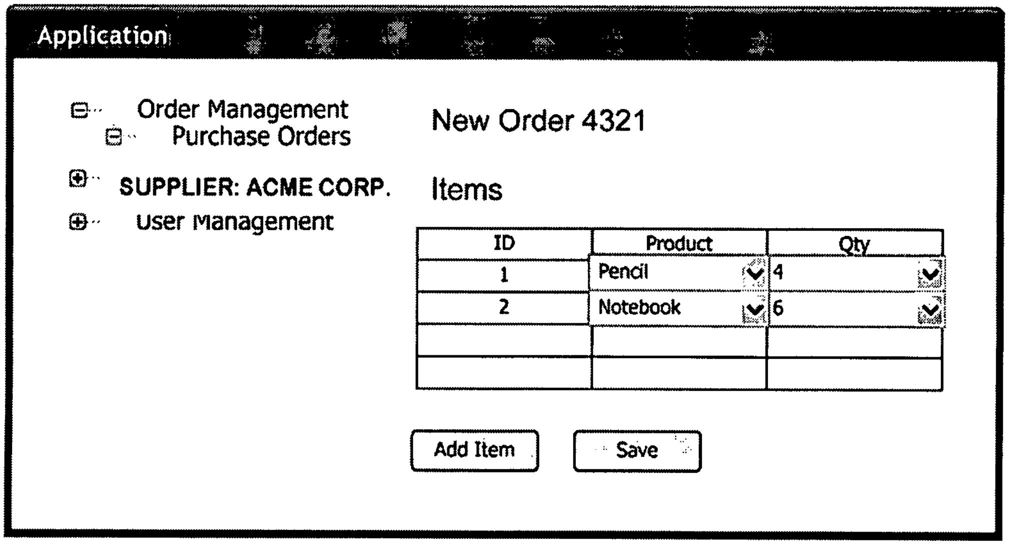
FIG. 5 is a diagram illustrating a second task template.

In another example, the user 310 seeks to order the same items but from a specific vendor. In order to access an applicable task template, only the name of the supplier needs to be added to the task request: "order 4 pencils, 6 notebooks, ACME Corp". The term ACME Corp. formed part of a previous task, and so this company name is included in the indexing service 350 (and the applicable information for ACME Corp. is then obtained from the application data store 380). Therefore, a task template, such as the task template 500 in FIG. 5, can be presented and populated by the business application 370 (as delegated by the execution engine 380) with both the pencil and notebook values, but also the contact information for ACME Corp.

As a further example, a few weeks after the most recent order for 4 pencils and 6 notebooks from ACME Corp., the same user 310 submits an abbreviated task request "order pencils". The indexing service 350 is polled in order to associate this task request with a certain task template. In this scenario, it will be recognized that the user had previously order pencils from ACME Corp. and so a task template populated with the vendor information for ACME Corp. and populated with a value of 4 pencils will be displayed (for the user to subsequently modify or approve) by the business application 370. If a user (or other grouping such as user group, company, IP address, etc.) had previously order pencils either in different amount or from different vendors, then the presented task template may include a drop down list for the value of pencils and for the particular vendor to supply the pencils.

The user interface 320 may also be equipped to simply provide more information regarding users, vendors, and the like. In one example, if the user 310 enters in ACME Corp. without reference to any certain actions, a supplier management module can be invoked so that additional information regarding the vendor can be displayed. Alternatively, the indexing service 350 might cause previously utilized task templates that involved ACME Corp. to be displayed by the business application 370. Similar features can be provided for user name searches. For example, if the entered name is ambiguous, e.g. there are several people named "Smith", or there is also a supplier company named "Smith", then the several results will be displayed just like in conventional search. Selection of one of the results will either result in further information being displayed or previously utilized task templates associated with "Smith" being presented.

Additionally features that can be implemented in the task request user interface include, recognition of misspelled or similar terms ("buy" instead of "order"), provision of a history of actions for a particular user (most recent and most used first), auto-completion when typing a content keyword (e.g. a supplier name, etc.), and continuous improvement based on user decisions (e.g. analysis of result clicks etc.).

In some implementations, the searching may relate to a business object or other data object. The following provides a sample search pattern for identifying a relevant object in response to a query.

1. If an object identifier (ID, name, description) is entered without any keywords, show the object details.

2. If the object identifier is ambiguous, present the user with the possible alternatives during the search.

3. If one or more parameter of the task templates is ambiguous (e.g. vendor, no. items for sales order) display a summary of the task, including placeholders for the parameters. The user will then be able to replace the placeholders with actual values.

4. For each placeholder, a list of potential values can be made available. The values with the highest probability (as decided by the system) are placed on top.

Figure 6:
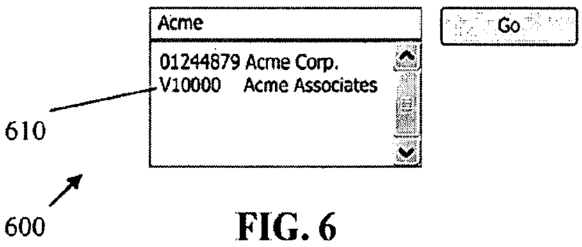
FIG. 6 is a window illustrating an interface for receiving a key word search for master business data.
Figure 7:
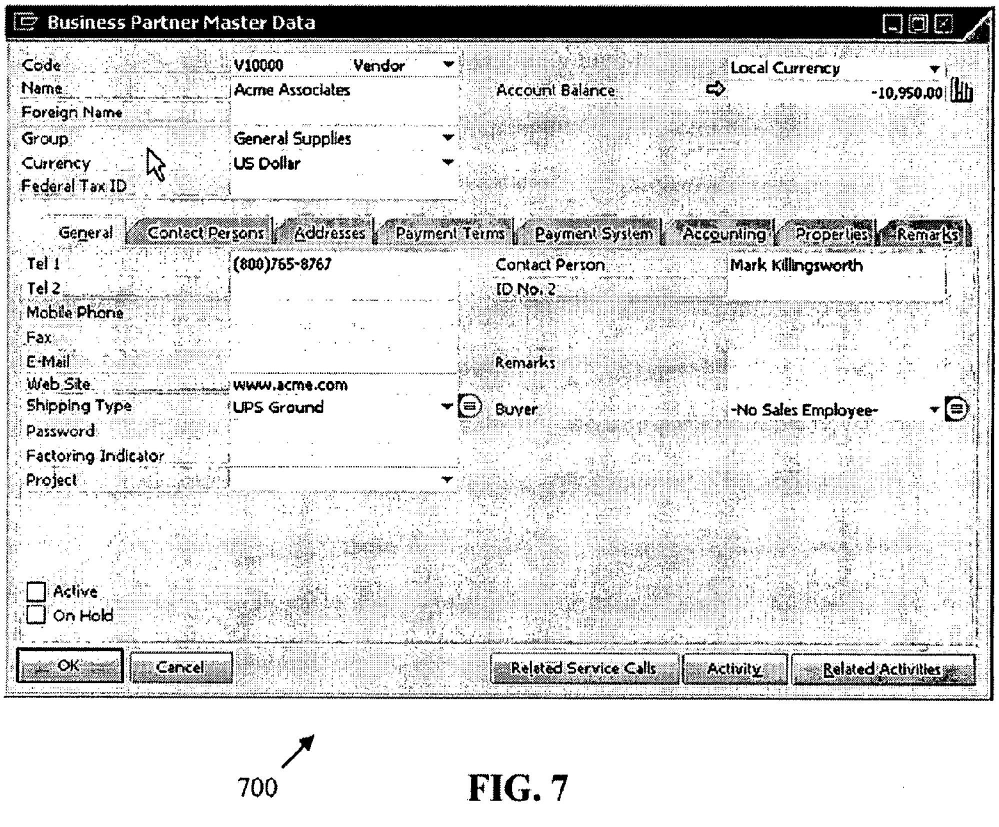
FIG. 7 is a window illustrating master business data displayed in response to the search illustrated in FIG. 6.
Figure 8:
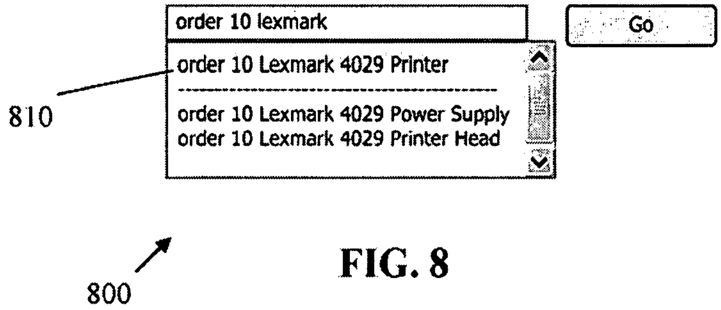
FIG. 8 is a window illustrating an interface for receiving a key word search to initiate a purchase order.
Figure 9:
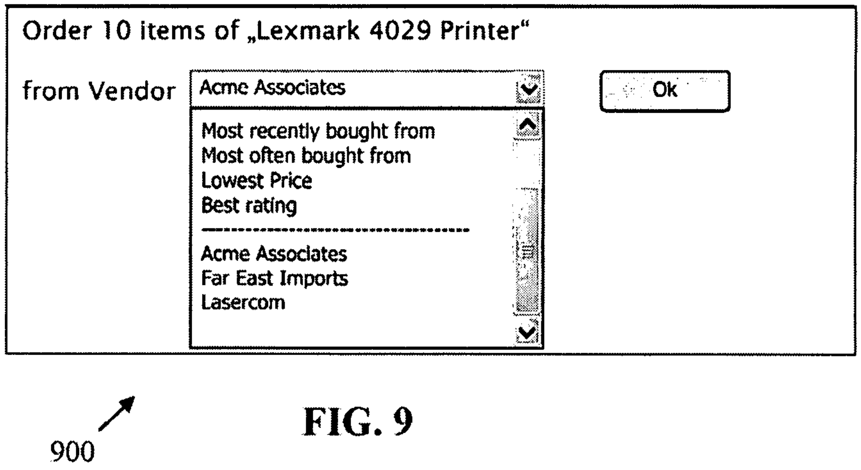
FIG. 9 is a window illustrating a selection of a vendor to fulfill the purchase order initiated in FIG. 8.
Figure 10:
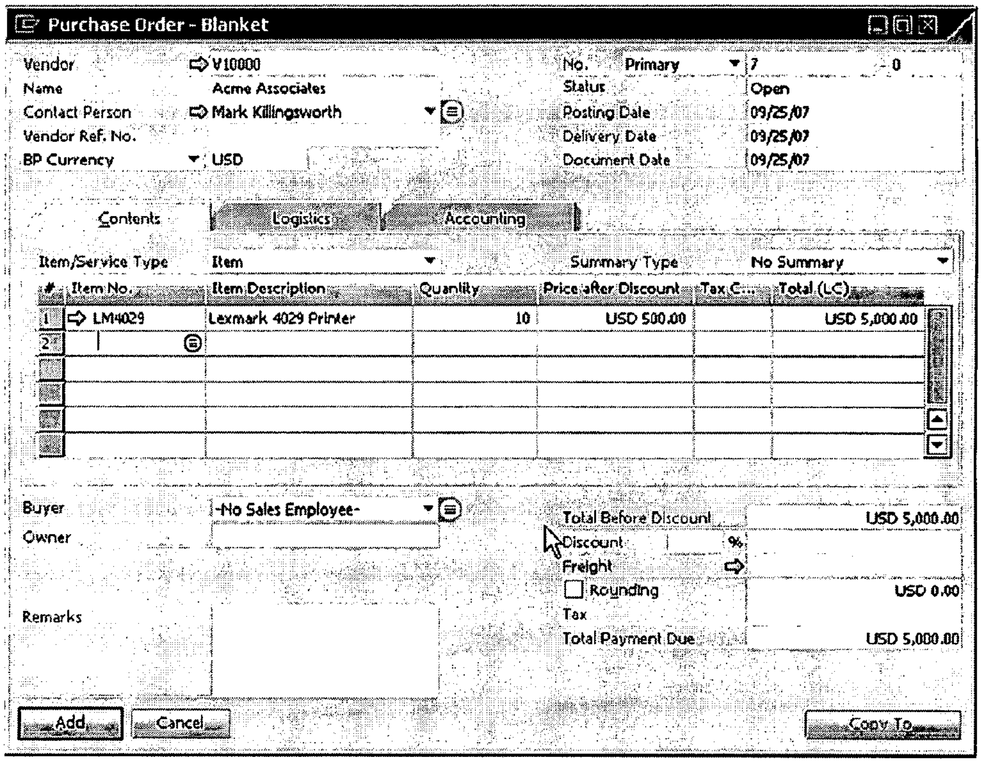
FIG. 10 is a window illustrating a purchase order template populated with the vendor selected in FIG. 9.

In one example, it is desired to view business partner master data. Rather than having to traverse through several sequential windows/menus in order to access master data for a vendor "ACME Associates", a user can, as illustrated in the window 600 of FIG. 6, enter the term "ACME" and obtain a listing of potential vendors (via a variety of techniques including AJAX, etc.). Selection of V10000 (610), causes a subsequent window 700 to be displayed containing master data for ACME Associates thereby obviating several steps required In another example, a user desires to create a purchase order. With conventional techniques, a user needs to select a purchase order module, select a vendor (e.g., "ACME Associates") from a list, select an item to purchase from such vendor, and select a quantity of such items to purchase, all using sequentially presented windows or menus. Using keyword navigation, a user may enter in the terms "order 10 lexmark" into as illustrated in window 800 of FIG. 8 and select "Lexmark 4029 Printer" (810) from a drop down menu. In some variations, those items that are provided in the drop down menu will be ranked according to factors such as most recent, most popular, and the like. Because there are several vendors in the database selling the selected printer, with reference to the screenshot 900 of FIG. 9, the user is prompted to select one. The system can suggest the best option based on recent information (such as "most often bought from", etc.), or the user can select a vendor individually. After selecting a vendor, a window 1000 as in FIG. 10 can be presented which includes a populated purchase order that the user can modify and/or approve.

Figure 11:
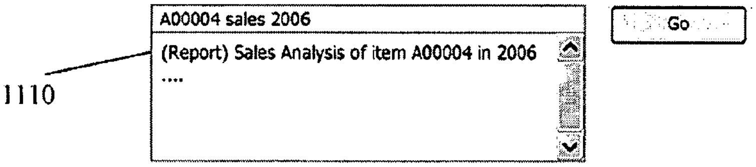
FIG. 11 is a window illustrating an interface for receiving key word search to initiate a report.

In yet another example, a user desires to display sales of item "A00004" in calendar year 2006. Rather than traversing a plurality of windows, a user can initiate keyword navigation by entering "A00004 sales 2006" into a prompt within a window 1100 as in FIG. 11. With such an arrangement, a drop down menu can illustrated an option for a Report 1110, the selection of which causes the report to be displayed.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. In addition, it can be appreciated that the techniques described herein can be used for a wide variety of applications in which a user needs to manually generate some portion of a task. Other embodiments may be within the scope of the following claims.

What is claimed is:

1. An article comprising a non-transitory machine-readable storage medium embodying instructions that when performed by one or more data processors of at least one computing system result in operations comprising:

receiving data comprising a task initiation request within a software application, the task initiation request comprising one or more object identifiers and one or more corresponding numerical values, the task initiation request comprising an alphanumeric string specified by a user via a search prompt in a graphical user interface;

associating, without further input from the user, the task initiation request with a corresponding task template selected out of a plurality of task templates, the associating being based on the received data;

automatically populating at least a portion of the selected task template with the one or more object identifiers and the one or more corresponding numerical values; and presenting the populated task template within the graphical user interface to enable a user to conduct one or more actions specified by the presented populated task template.

2. An article as in claim 1, wherein the associating comprises:

polling a data repository to identify one or more stored task templates.

3. An article as in claim 2, wherein the populated task template is populated based on two or more identified stored task templates.

4. An article as in claim 3, wherein at least one portion of the populated task template includes options derived from different identified stored task templates requiring user selection.

5. An article as in claim 2, wherein the identified stored task templates are selected based on at least one of the terms matching a task template previous generated by the user.

6. An article as in claim 5, wherein the identified stored task templates are further selected based on at least one of the terms matching a task template previous generated by an entity other than the user.

7. An article as in claim 2, wherein the identified stored task templates are selected based on pre-defined rules associating at least one of the terms with a stored tasked template.

8. An article as in claim 1, wherein the polling a data repository comprises:

polling an index of the data repository to map at least one of the terms to at least one task template.

9. An article as in claim 1, wherein populating comprises activating at least one graphical user interface element on the task template.

10. An article as in claim 9, wherein the at least one graphical user interface element is a button.

11. An article as in claim 1, wherein populating comprises populating at least one field in the task template with one of the terms.

12. An article as in claim 1, wherein presenting the populated task template comprises activating a module in the software application causing the task template to be presented and to be at least partially populated.

13. An article as in claim 1, wherein the task template is a form.

14. An article as in claim 1, wherein the actions conducted by the user including modification or approval of the presented populated task template.

15. An article comprising a non-transitory machine-readable storage medium embodying instructions that when performed by one or more data processors of at least one computing system result in operations comprising:

receiving first data comprising one or more terms within a task initiation request, the task initiation request being specified by a user via a search prompt in a graphical user interface, the task initiation request comprising one or more object identifiers and one or more corresponding numerical values;

polling, without further input from the user, a data repository to obtain a plurality of task templates associated with the terms;

presenting second data characterizing the plurality of obtained task templates to a user;

receiving user-generated input selecting one of the presented plurality of obtained task templates;

automatically populating at least a portion of the selected task template with the one or more object identifiers and the one or more corresponding numerical values; and presenting the selected task template to enable the user to conduct one or more actions specified by the presented task template.

16. An article as in claim 15, wherein the obtained task templates are selected based on at least one of the terms matching a task template previous generated by the user.

17. An article as in claim 16, wherein the identified stored task templates are further selected based on at least one of the terms matching a task template previous generated by an entity other than the user.

18. An article as in claim 15, wherein the obtained task templates are selected based on pre-defined rules associating at least one of the terms with a stored tasked template.

19. An article as in claim 15, wherein the polling a data repository comprises:

polling an index of the data repository to map at least one of the terms to at least one task template.

20. An article comprising a non-transitory machine-readable storage medium embodying instructions for execution by at least one data processor of at least one computing system, the instructions implementing software modules comprising:

a user interface to receive a user-generated task request from a user comprising an alphanumeric string containing comprising one or more object identifiers and one or more corresponding numerical values via a search prompt;

a parsing engine to parse the task request;

a first data repository coupled to the parsing engine to store user-defined rules associated search terms with task templates;

an indexing service coupled to the parsing engine to provide an index characterizing previously generated task templates;

an application data store coupled to the indexing service to store data characterized in the indexing service;

an execution engine coupled to the parsing engine to initiate a generation of a task template based on the terms in the user-generated task request without further input from the user; and a business application coupled to the execution engine to present a user with a task template in response to a delegation by the execution engine, the business application further being coupled to the application data store to obtain contextual information based on the one or more object identifiers and the one or more numerical values for at least partially populating the task template.

* * * * *